United States Patent [19]

van der Linden

[11] Patent Number: 5,032,988
[45] Date of Patent: Jul. 16, 1991

[54] METHOD OF AND DEVICE FOR VERIFYING A MATHEMATICAL PROOF

[75] Inventor: Franciscus J. van der Linden, Eindhoven, Netherlands

[73] Assignee: U.S. Philips Corporation, New York, N.Y.

[21] Appl. No.: 283,687

[22] Filed: Dec. 13, 1988

[30] Foreign Application Priority Data

Dec. 23, 1987 [NL] Netherlands .................. 8703110

[51] Int. Cl.⁵ .............................................. G05B 13/04
[52] U.S. Cl. ............................................... 364/400
[58] Field of Search .............. 364/400, 402, 900, 200

[56] References Cited

U.S. PATENT DOCUMENTS

4,044,476  8/1977  Tanifuji ............................. 304/150

OTHER PUBLICATIONS

L. S. van Benthem Jutting, 'Checking Landau's "Grundlagen" in the Automath System', Mathematical Centre Tracts vol. 83 (Amsterdam 1979).

Manna et al, "A Deductive Approach to Program Synthesis", ACM Tran. on Programming Languages and Systems, vol. 2, No. 1, Jan. 1980, pp. 90-121.

J. Moor et al., "Bertie-II: Personal Computers and Logic", Teaching Philosophy 8:4, Oct. 1985, pp. 319-323.

J. Moor et al., "Computer-Assisted Instruction in Logic: BERTIE", Teaching Philosophy 2:1, Spring 1977, pp. 1-6.

Communication from the European Patent Office Dated Apr. 11, 1989 in EP 88202949.9, a Corresponding Application.

Primary Examiner—Jerry Smith
Assistant Examiner—Kim T. Tbui
Attorney, Agent, or Firm—Anne E. Barschall

[57] ABSTRACT

A method and a device are described for verifying a mathematical proof which is formulated in a typed high-order language as a sequence of lines. From this sequence a sequence of sub-sequences is formed. These sub-sequences are successively assigned to verification processors; when all verification processes are engaged in the verification, the row of sub-sequences already having been assigned is uninterrupted. Each verification process produces a positive result, a negative result, or is trapped in an infinitely long verification process. As a result of the specific organization of the assignment, in the latter case one veritification process will always produce a negative verification. A fast procedure is achieved by assignment to a plurality of verification processes.

7 Claims, 3 Drawing Sheets

```
begin
    var S,          ## lines to be checked
        f,          ## father of the node
        sons,       ## sons of the node
        s,          ## variable varying over sons
        stop        ## boolean, stop criterion f ? receive_lines(S'); S ← S';
    for s ∈ sons do give_part(s) od;
    stop ← false;
    while not stop do
        if f ? error then distribute_error; stop ← true fi;
        if s ? error then f ! error; distribute_error; stop ← true fi;
        if s ? get_new_lines then
            if S = ∅ then
                f ! get_new_lines;
                if f ? error then distribute_error; stop ← true fi;
                if f ? receive_lines(S') then S ← S'; give_part(s) fi;
                if f ? stop then stop ← true; s ! stop fi;
            else give_part(s)
            fi
        fi
    od;
    while sons ≠ ∅ do
        if f ? error then distribute_error fi;
        if s ? error then f ! error; distribute_error fi;
        if s ? get_new_lines then s ! stop fi;
        if s ? finished then sons ← sons - s fi
    od;
    f ! finished
end
```

FIG. 3

```
procedure give_part(s)
    var S₁     ## Subset of S

S₁ ← {nonempty subset of S, consisting of an
                               initial sequence of lines};
    s ! receive_lines(S₁);
    S ← S - S₁
end give_part procedure distribute_error
    for s ∈ sons do s ! error od
end distribute error
```

FIG. 4

```
begin
    var S,         ## Lines to be checked
        f,         ## father of the node
        stop,      ## boolean, stop criterion
        error      ## boolean, true if an error occurred stop ← false;
    error ← false;
    while not stop do
        if f ? error then error ← true; stop ← true fi;
        if f ? stop then stop ← true fi;
        if f ? receive_lines(S') then S ← S';
            while not all lines are checked and not error do
                check lines for a finite amount of time;
                if f ? error then error ← true; stop ← true fi;
                if error found in S then
                    f ! error;
                    error ← true;
                    stop ← true;
                fi
            od
        fi;
        f ! get_new_lines
    od;
    if not error then f ! finished fi
end
```

FIG. 5

METHOD OF AND DEVICE FOR VERIFYING A MATHEMATICAL PROOF

BACKGROUND OF THE INVENTION

The invention relates to a method of verifying a mathematical proof which is formulated in a typed higher-order language. The fact that a language is a typed higher-order language means that it contains typed terms and that so-called higher-order constructs are used. The language is chosen because it is better suited to the normal mathematical formulations than the so-called first order languages. The latter languages are more frequently used because of their simple structure, but have less power of expression due to limitations to the constructs to be used. An example of such a typed higher-order language and its use is described in L. S. van Benthem Jutting, Checking Landau's "Grundlagen" in the Automath System, Mathematical Centre Tracts, Vol. 83, Amsterdam, 1979. A typed higher-order language is a logic language which is composed of terms, categories of terms being: types, expressions, "ordinary" terms, proofs, propositions, abbreviations, being names for respective other terms; in this respect a variety of categories of terms is permissible. The expression of a term may be, for example a constant, a variable or a function. The terms are linked by constructors indicating relationships between terms. Constructors can indicate arithmetical operations, logic operations, implications and so on. Such a language can be used in order to formulate a mathematical proof, where each of the various parts of the proof is given a name and is included in a hierarchical structure of parts of each time higher order until a name of highest order is given. Such a proof is then formulated in a sequence of lines, each line in the sequence being not lower in the hierarchy than all preceding lines in the sequence. This means: the later line is either higher in the hierarchy or no relationship exists between the two lines.

For the method of verifying a mathematical proof consisting of a number of sub-proofs it is necessary that the following requirements are satisfied for the successive assignment of the abbreviations or lines:
1. A series of verifications must be performed on the "lines";
2. Each "line" is influenced by an environment in which zero or more other "lines" are present which occupy a preceding position in the sequence and hence have a lower level in the hierarchy;
3. The result of the verification of a "line" is determined by all lines in the environment; it is not necessary for all such environmental lines to make also a material contribution to the determination thereof;
4. When all "lines" in the relevant environment are correct, the verification of the relevant line can be executed in a finite number of steps and offer the result "correct" or "error". The period of time required is also finite and depends on the processing speed.
5. However, when one or more "lines" in the relevant environment are not correct, a third result is feasible in that the number of steps required becomes infinitely large, notably because the verification process starts to circulate infinitely long in a loop. The verification of the proof in the sequence of the lines, therefore, always offers a correct answer within a finite period, but because of the large number of steps required this period of time is sometimes unacceptably long.

SUMMARY OF THE INVENTION

Among other things, it is an object of the invention to provide a method of accelerating the verification of a mathematical proof formulated in such a language, in which on the one hand the detection of an error is indicated to a user with absolute certainty without giving rise to an infinitely long duration of the method, while on the other hand the complexity remains limited. According to a first aspect, the object in accordance with the invention is achieved in that a method of verifying a mathematical proof formulated in a typed higher-order language is characterized in that the proof is formulated in a first sequence of lines, each line in the sequence not being lower in the hierarchy than any preceding line in the sequence, which method comprises the following steps:

during a distribution process successive sub-sequences of lines are formed from the first sequence of lines;

the distribution process each time assigns a next sub-sequence to an available verification process of a second series of verification processes for the purpose of verification, a verification process receiving not only a sub-sequence assigned thereto but also all preceding sub-sequences in order to abstract from said preceding sub-sequences the type definition of the names occurring in the assigned sub-sequence;

the series of verification processes execute the verifications, a positive verification resulting in a "ready" signal, a negative verification resulting in an "error" signal, and a non-interrupted verification providing neither a "ready" signal nor an "error" signal;

upon reception of an "error" signal, the distribution process delivers a stop signal to all verification processes, but upon reception of an adequate number of "ready" signals, it provides an "OK" signal to a user.

The successive assignment of the sub-sequences in sequence to the verification processes must be performed so that, if no verification process is available, i.e. they are all busy, a sequence of consecutive sub-sequences is being processed: thus, no sub-sequence has been skipped. When this condition is satisfied, it is not strictly necessary to adhere to the assignment sequence at the level of the sub-sequence; however, at the level of the series of verification processes it must be maintained.

The invention also relates to a multiprocessor device for executing the method.

Further aspects are recited in the dependent Claims.

BRIEF DESCRIPTION OF THE FIGURES AND TABLES

The invention will be described in detail hereinafter with reference to some Figures:

FIG. 3 is Table A, which illustrates the operation of a distribution process.

FIG. 4 is Table B, which illustrates two communication operations of a distribution process;

FIG. 5 is Table C, which illustrates the operation of a verification process.

Figure 1:
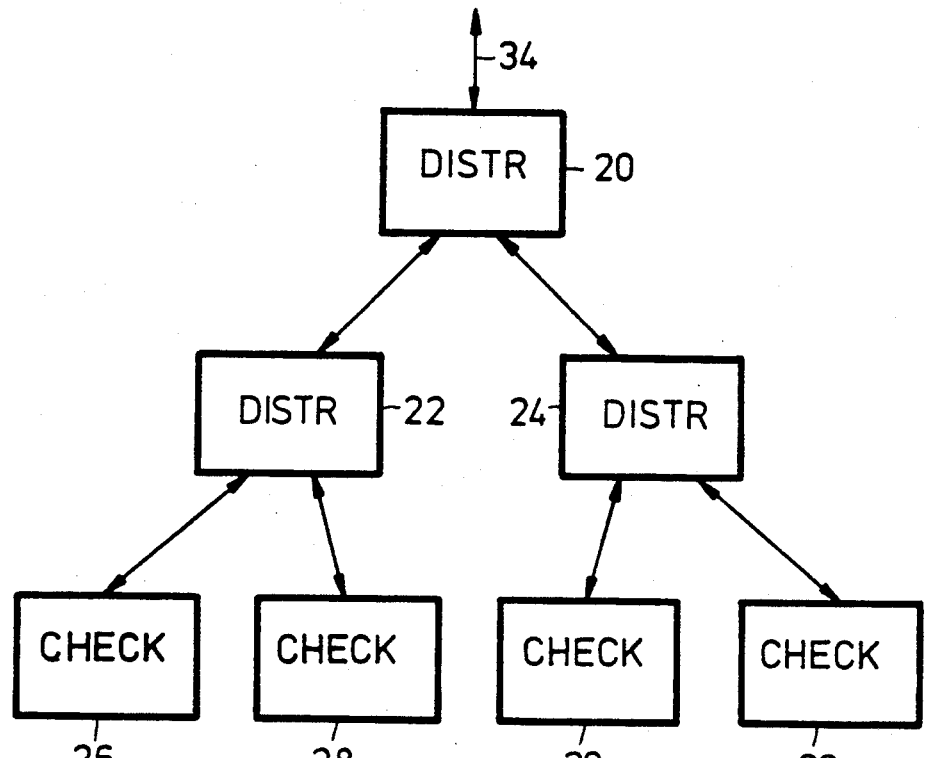
FIG. 1 shows a distribution diagram of a device in accordance with the invention.

The description will first explain the Automath system, and subsequently an implementation on a tree structure of stations.

DESCRIPTION OF THE AUTOMATH SYSTEM.

The Automath system will be explained hereinafter. The invention can also be used in an environment of other languages satisfying the same requirements, for example the "Nuprl" system (R. L. Constable et al, Implementing mathematics with the Nuprl proof development System, Englewood Cliffs, 1986). A text in the Automath language consists of a number of lines, each line of the form: C*N:=a:T Therein, -C- is a set of terms which may, therefore, be empty; this is the set of variables and assumptions, including the one indicating that the type of -a-: type (a)=T. The elements of C are parameters of N. When N is to be used subsequently, these parameters should be inserted. The asterisk separates the assumptions from the remainder of the line.

Furthermore, -N- is a name or abbreviation for the more complex term a, each line introducing a new name N: N can be considered to be a standard proof of an axioma T, a constant of the type T, or a constructor for forming other terms. The use of N as a constructor enables an arbitrary constructor to be defined.

The indication -a- can represent a term, a type, a proposition or a proof of a proposition. If -a- exists, therefore, the abbreviation N can be used. Lines can be used without using -a-, for example, as an introduction of axiomas, constants or variables. A line can thus use a variety of information defined in preceding lines. The described mechanism operates as a compact formulation facility for a and T. A line in the Automath language can thus be considered to be a tableau line: the context C is a series of assumptions; the indication -a- is a term or a proposition, the indication -T- represents the type of -a- or the proposition for which -a- is the proof. The line is correct if the type of -a- is indeed equal to -T-. Tableau lines are described in the article Z. Manna and R. Waldinger, A deductive approach to Program Synthesis, ACM Trans. on Programming Languages and Systems, Vol. 2, (1980), pp. 90-92.

The environment of a line is composed of all preceding lines of which any abbreviation has been used, together with the environments of these preceding lines. The environment of the first line is empty. The text or the proof is correct when each line is correct in relation to its environment. A line -L- is correct if the term a defined in L has a type equal to T. In order to obtain a positive verification result, all lines in the environment themselves must be correct. A correct text in such a typed higher-order language thus represents a proof; the verification of this proof is executed as a series of checks as regards the correctness of a type.

The Automath system verifies proofs written in the Automath language (and analogously for other languages satisfying the cited requirements). A line is verified in that parts of the line are reformulated until the conclusion whether or not the part -a- has the type -T- can be directly drawn. The reformulation can be performed a number of times in succession, if necessary. Reformulation is realized by each time replacing an abbreviation by a usually more extensive representation thereof whose parts have a simpler structure and by transforming the expression obtained into an ordinary or standard form. A term is typed when two conditions are satisfied:

the term must be correctly formed: all constructors have enough, known arguments; variables must be real variables;

all abbreviations used in the construction of the term themselves are typed.

Therefore, a verification as regards typing first of all consists in a check of correct representation, and subsequently rewriting. However, if anywhere in the text a term -a- utilizes an abbreviation of a non-typed term, the rewriting of -a- may require an indefinite number of operations, and hence last an indefinite period of time. The following is an elementary example: assume that the following line occurs in an initial part of an Automath text:

∅*a:=g(a): type;

therein, -∅- is an empty set, -g- is a function, and the semicolon does not form part of the actual Automath text. Moreover, this line is incorrect. This error is verified during the sequential verification of the text, thus stopping the verification. In the case of distributed verification, this line is verified in a process other than further lines of the text which are, for example:

type (f)=a->b; the function space with originals in -a- is mapped in -b-;

type c=g(a);

to be proved: type f(c)=b;

in that case, it should actually be proved that type (c)=a.

Using the knowledge of the first line mentioned, the latter could be expanded an indefinite number of times without giving rise to either correct verification or a distinct error:

type(c)=g(a);

type(c)=g(g(a)); etcetera.

The latter expansion can be blocked, but in a more complex environment it is often impracticable to render such blocking error-free.

DESCRIPTION OF A PREFERRED EMBODIMENT

FIG. 1 shows a distribution diagram of a preferred device in accordance with the invention. The device is constructed as a hierarchically organized multiprocessor system comprising the sub-processors 20, 22, 24, 26, 28, 30, 32. The first three sub-processors together constitute a distribution processor. The last four sub-processors constitute verification processors. The number of verification processors as well as the width and the depth of the tree of distribution processors are arbitrary per se. The text in the Automath language which is to be verified is received on connection 34. The sub-processor 22 emulates a verification processor vis-à-vis the sub-processor 20. The same holds good for all sub-processors which are lower in the hierarchy, each time vis-à-vis one sub-processor at a next-higher hierarchic level. The sub-processor 22 emulates a distribution processor vis-à-vis the sub-processors 26, 28. The same holds good for all sub-processors which are higher in the hierarchy with respect to a non-empty set of sub-processors at a next lower hierarchic level (if present). A sub-processor may itself be active in a multiprocess operation, for example when use is made of a time multiplex organization. In FIG. 1 each process is then represented by its own block: thus, a priori a given processor may accommodate a distribution process as well as a verification process. The foregoing limits the processing speed to be achieved with respect to a system comprising (even) more sub-processors.

When the sub-processor 20 has received the text, successive sub-sequences of lines are separated therefrom. A first sub-sequence is applied, for example to the sub-processor 22. A second sub-sequence is applied to the sub-processor 24, together with all preceding sub-sequences, so in this case only the first sub-sequence. It may be that no further sub-sequences remain; it may also occur that there is a further sub-sequence. The sub-processors 22, 24 serve to ensure the verification of the first sub-sequence and the verification of the second sub-sequence, respectively. Because they are not arranged at the lowest hierarchic level, they act in the same way as the sub-processor 20. Thus, they form sub-sequences of the second order for supply to the sub-processors 26, 28, 30, 32. Consequently, each of the latter processors receives its own sub-sequence of the second order, together with all preceding sub-sequences of the second or the first order. Furthermore, these four subprocessors are arranged at the lowest hierarchic level, so that they perform the actual verification. The completion of the verification of a sub-sequence is signalled to the next-higher level; thus, the supply of a next sub-sequence is implicitly requested, including further sub-sequences which are not to be verified but which occur previously in the text. Signalling continues as far as higher hierarchic levels until a further sub-sequence is available, which sub-sequence is then applied to the requesting sub-processor, or until no further sub-sequence is available at the highest hierarchic level; the verification is then at least partly complete. When the above request has been made by all sub-processors of the highest level but one without any further sub-sequence becoming available, the verification has been completed and successfully terminated. This is signalled to a user.

When an error is detected during any verification, this error is signalled to all other sub-processors and to the user, via the hierarchic structure, thus terminating the verification.

Figure 2:
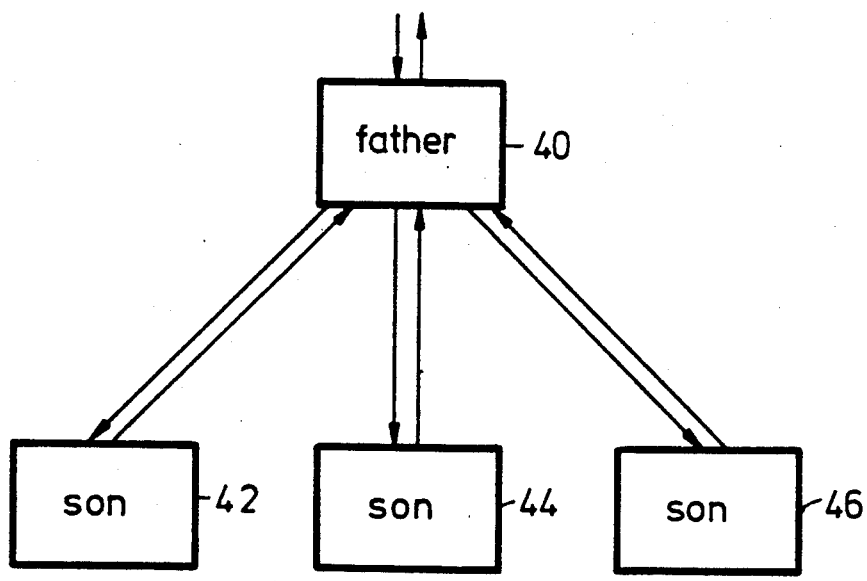
FIG. 2 shows a diagram illustrating the communication between some processes.

In this respect FIG. 2 shows an example of a diagram of the communication between a father process 40 and three son processes 42, 44, 46; in this context process and processor may be considered to be identical; the differences occur only at a lower level of the communication protocol.

Between the user (not shown) and the sub-processor of the highest hierarchic level 40 three messages occur:

sequence of lines: the user submits a verification request as regards a supplied sequence of lines;

error: the verification result is negative, possibly provided with a parameter indicating the first line where an error was found;

o.k.: the verification result is positive.

Between a further, arbitrary pair of sub-processors at two directly successive hierarchic levels the following messages occur:

a. transmitted by the higher sub-processor:

receive lines; this is a message containing a further sub-sequence of lines and, in as far as necessary, previous sub-sequences of lines of the Automath text;

stop; this is a message indicating that no further sub-sequences of lines are to be expected, so that in as far as the receiving sub-processor and any subordinate sub-processors are concerned, no further verification need be started; this does not mean that the latter sub-processors must have been stopped, and certainly not that the verification has thus been completed; it is a message which has relevance only for sub-processors which were already finished;

error; this is a message indicating that a verification operation has had a negative result; the latter message means that all sub-processors and subordinate sub-processors can terminate their operation.

b. transmitted by the lower sub-processor;

get new lines; this is a message representing a positive verification result and also a request for the supply of a new sub-sequence of lines for verification, including also any necessary previous sub-sequences in as far as they have not yet been supplied to the revelant sub-processor;

error; this is a message that a verification has had a negative result in any subaltern sub-processor vis-à-vis the revelant connection; this may be one of the sub-processors 42, 44, 46 shown, but also a sub-processor at a still lower hierarchic level; the error signal is thus communicated in the ascending as well as in the descending progression;

finished; this is a message which acts as an acknowledgement of the reception of the previously described "stop" message.

It is to be noted that the described message system represents one of various possibilities, that different aspects thereof can be used in any multiprocess situation in which tasks are subdivided in sub-tasks and the sub-tasks are sent to lower hierarchic levels, and that the present invention does not relate to such a message structure itself.

DESCRIPTION OF THE ACTION OF A DISTRIBUTION NODE

Table A shows the action of a distribution node. The lines of the action are numbered from 1 to 30. After the start, the variables are declared. Line 2 defines the set of the lines to be verified. Line 3 identifies the father process of the node, for the highest-level process it identifies the user. Line 4 identifies the (one or more) son processes of the node; these may be further distribution nodes or other verification nodes (a mixture is also possible). The father node, if present, is always a distribution node. Line 5 contains a variable varying over the set of sons. Line 6 defines a stop criterion having a binary value. Line 7 shows the reception of the set of lines to be verified, after which the variable S obtains the correct value. According to line 8 each of the son processes is assigned a sub-sequence of the lines to be verified. On line 9 the stop criterion is made false. On line 10 an iterative procedure is started which is terminated only when the stop criterion is true. Line 11 indicates that, when an error signal is received from a father process, all son processes receive an error signal. Line 12 shows that, when an error signal is received from one of the son processes, an error signal is applied to the father process and to all other son processes. The stop criterion is made true on both lines 11, 12. Line 13 states: if a request for the supply of further lines is received from a son process (meaning that the verification is finished, ultimately or not), a next procedure is executed. Line 14: if the set of lines not yet despatched for verification was (or has become) empty, a request for the supply of further lines is made to the father process on line 15. If an error indication is received from the father (line 16), an error message is despatched to all son processes and the stop criterion is locally made true. Line 17: if a sub-sequence of (further) lines is received from the father, this sub-sequence becomes the new set of lines to be verified and a sub-sequence of this set (this may possibly concern the entire remaing set) is assigned to the son process having made the request of line 13. When a stop signal is received from the father process (line 18), the stop criterion is locally made true and applied to the son process that had despatched the request of line 13. For as long as the set has not become empty, the assignment thereof to the son processes is continued. Line 20 is the pendant of the line 16; line 21 is the pendant of the line 13. Line 22 is the counterpart of the line 10. Line 23 illustrates what happens when the condition of line 10 is no longer applicable: the stop criterion has become true (lines 11, 12, 16, 18). For all son processes the following operation is then performed. Line 24: when an error signal is received from the father process, this signal is applied to all son processes. Line 25: when an error signal is received from a son process, this signal is applied to the father process and to all other son processes. When a request for further lines (line 26) is received from a son, a stop signal is applied to this son. When a "ready" signal is received from a son, the set of son processes considered is reduced by this particular son process. When all sons have been dealt with (line 28), a "ready" signal is applied to the father process (line 29), and the execution is terminated (line 30).

Table B shows two communication operations of a distribution process. The first operation is the actual distribution procedure for lines to be verified as stated on the lines 8, 17 in Table A. First a variable S1 is defined, being a sub-set of the set of all lines to be verified. On line 3 this variable is defined as a non-empty sub-set consisting of an initial sequence of lines of the lines to be verified. On line 4 a message representing the set S1 is applied to the son S. On line 5 a new main set, i.e. the remaining lines of the set S, is updated. Line 6 signals the end of the procedure. It is to be noted that the magnitude of the set S1 must be selected on the basis of the actual situation.

Line 7 shows the procedure "distribute error" of the lines 11, 12, 16, 24, 25 in Table A. Line 8 illustrates the action of this procedure: for a current value of s, each time the son having the rank number s receives the error message. Line 9 signals the end of the procedure.

If the distribution process were situated at the highest hierarchic level in the above case, all communication with the hierarchically next-higher distribution process would be dispensed with. In Table A this concerns the following lines: line 3 (instead a signalling "highest level" can take place); line 7 (this can be replaced by signalling the sequence of lines received from the user); line 9 (not applicable); line 15; line 16; line 17 (it is assumed that the sequence of lines to be verified is received in one operation); line 18 (actually, the entire procedure of the lines 14–20 can be formulated more compactly, as follows: supply sub-sequences until the set of lines still to be verified has become empty); line 24; line 29. The lines 7, 25, 29 represent the user interface described with reference to FIG. 2.

DESCRIPTION OF THE VERIFICATION PROCESS

Table C illustrates a preferred version of the execution of a verification process. After the start on line 1, the following variables are declared: on line 2 the set of all lines to be verified; on line 3 the father process of the verification node (for example, in the form of an address or identification); on line 4 the boolean already mentioned stop criterion; on line 5 a boolean error message which becomes true when error has been found. Lines 6, 7 render these two variables false. On line 8 a loop commences, which loop is continuously repeated until the stop criterion becomes true. When an error message is received from the father process (line 9), the booleans of lines 4, 5 are both made true. When a stop message is received from the father process (line 10), the stop message is locally made true. When a subsequence of lines is received from the father (line 11), the sequence of lines to be verified is locally made equal to this (sub) sequence received. Lines 12, 13 define the actual verification process: for as long as no error is found, the verification process continue for a finite period of time. The fact that this period of time is finite indeed is not imposed by the contents of the lines 12, 13, but by the structure of the distribution between the processors and the distribution of an error message, if any. The assignment of the subsequences in the correct sequence (this holds good for each distribution process separately) to the son processes (verification processes or subaltern distribution processes) ensures the correctness in a sense that only a finite number of steps will be required for the verification. Line 14 corresponds to line 9. Line 15 starts a procedure in response to the local detection of a negative verification result: an error message is despatched to the father process; moreover, the error message is locally made true; furthermore, the stop message is locally made true. Line 19 terminates the latter procedure. Line 20 terminates the action of line 12. Line 21 terminates the action of line 11. Line 22 indicates that the process, after completion of a sub-task, requests the supply of a new sub-sequence of lines. Line 23 terminates the action of line 8. Line 24 indicates that, if there are no further lines to be verified and the error message is still false, the ready signal is applied to the father. Line 25 terminates the action.

What is claimed is:

1. A method for distributing processing of verification of a mathematical proof amongst a plurality of processors, which proof is formulated in a typed higher-order language and contains a first sequence of lines, which lines are organized in a heirarchical structure, each line in the first sequence not being lower in the heirarchical structure than any preceding line in the sequence, the method comprising the following steps:
   (a) forming a plurality of successive sub-sequences of lines from the first sequence of lines, in a distribution processor;
   (b) assigning a sub-sequence to be a current sub-sequence in a current verification processor, which is available, for the purpose of verification;
   (c) sending all sub-sequences preceding said current sub-sequence to the current verification processor;
   (d) abstracting, from said preceding sub-sequences, type definitions corresponding to names occurring in the assigned sub-sequence;
   (e) verifying the current sub-sequence in the current verification processor;
   (f) supplying from the current verification processor to the distribution processor, in response to said verifying step, one of:
      (i) a "ready" signal indicating a positive result of the verifying step;

(ii) an "error" signal indicating a negative result of the verifying step; or (iii) no signal, indicating that the verifying step is in process;

(g) repeating steps b)-f) for each of the plurality of successive sub-sequences, until the "error" signal is received or a predetermined number of "ready" signals are received, said repeating being performed in parallel for at least two sub-sequences by distinct verification processors; and (h) supplying from the distribution processor one of:
(i) a "stop" signal to all verification processors, in response to the "error" signal; or
(ii) an "o.k." signal to a user, in response to the predetermined number of "ready" signals.

2. The method of claim 1, further comprising the steps of:
requesting, by the current verification processor, assignment of a further sub-sequence along with any corresponding preceding sub-sequences, after the current verification processor supplies the "ready" signal; and
enabling the verification processors to supply respective "o.k." signals after all of the plurality of successive sub-sequences have been assigned for verification.

3. A method as claimed in claim 1 or 2, wherein
each line has a rank number
said "error" signal contains the rank number of a line producing the negative result,
said "stop" signal contains the rank number of the line producing the negative result,
the method further comprises the step of, in response to said "stop" signal, repeating steps b)-f) for lines having rank numbers lower than the rank number of the line producing the negative result, thus receiving from the verification processors one of a secondary "error" or a secondary "ready" signal, and
said "O.K." signal contains a lowest rank number appearing in any "ready" or secondary "ready" signal.

4. The method of claim 1, wherein several sub-sequences are verified sequentially on the same verification processor.

5. Apparatus for distributing processing of verification of a mathematical proof, which proof is formulated in a typed higher-order language and contains a first sequence of lines, which lines are included in a heirarchical structure, each line in the first sequence not being lower in the heirarchical structure than any preceding line in the sequence, the apparatus comprising
a plurality of processors organized in a hierarchy, a single sub-processor forming a highest level of the hierarchy, each other processor manifesting itself as
(a) a respective verification processor with respect to an associated processor which is at a level in the hierarchy which is immediately below the other processor, and
(b) a respective distribution processor with respect to any associated processor which is at a next-lower level in the hierarchy
I. each respective processor, which is not at a lowest level of the heirarchy comprising, for functioning as a distribution processor, with respect to processors which are lower in the heirarchy:
(a) means for receiving the first sequence of lines;

(b) means for:
(i) forming a plurality of successive sub-sequences of lines from the first sequence of lines;
(ii) assigning a sub-sequence designated as a current sub-sequence to an available verification processor for the purpose of verification;
(iii) sending all sub-sequences preceding said current sub-sequence to the available verification processors;
(iv) receiving from the available verification processor, one of:
(A) a "ready" signal indicating a positive result of verifying the assigned sub-sequence;
(B) an "error" signal indicating a negative result of the verifying of the assigned sub-sequence; and
(C) no signal, indicating that the assigned verification processor is processing the assigned sub-sequence; and v) supplying, upwardly in the heirarchy, one of:
(A) a "stop" signal to all verification processors below the respective processor, in the hierarchy, in response to the "error" signal; or
(B) an "o.k." signal, in response to a predetermined number of "ready" signals;
(vi) iteratively designating a new sub-sequence as the current sub-sequence and repeating steps ii-v) until the entire first sequence is processed;

II. each respective processor, which is not at the highest level of the heirarchy, comprising for functioning as a verification processor, with respect to processors which are higher in the heirarchy:
(a) means for abstracting type definitions corresponding to names occurring in a portion of the first sequence;
(b) means for verifying the portion of the first sequence;
(c) means for supplying upwardly in the heirarchy, in response to said verifying, one of:
(i) a "ready" signal indicating a positive result of the verifying;
(ii) an upward "error" signal indicating a negative result of the verifying; or
(iii) no signal, indicating that the verifying is in process.

6. The apparatus of claim 5, wherein
I. each respective processor, which is not at the highest level of the heirarchy, further comprises for functioning as a verification processor:
(a) means for requesting, a further sub-sequence along with any corresponding preceding sub-sequences, in response to the "ready" signal indicating the positive result of the verifying; and
(b) means for cancelling the "ready" signal after said requesting; and
II. each respective processor, which is not at the lowest level of the heirarchy further comprises, for functioning as a distribution processor:
(a) means for enabling the verification processors to supply "o.k." signal only when all sub-sequences have been assigned for verification.

7. The apparatus of claim 5 or 6, wherein
each line has a rank number,
said "error" signal contains the rank number of a line producing the negative result, said "stop" signal contains the rank number of the line producing the negative result, in response to said "stop" signal, as part of the distribution processor function, each processor which is not at the lowest level of the heirarchy assigns sub-sequences to verification processors for lines having rank numbers lower than the rank number of the line producing the negative result, thus receiving from the verification processors one of a secondary "error" or a secondary "ready" signal, and said "O.K." signal contains a lowest rank number appearing in any "ready" or secondary "ready" signal.

* * * * *